United States Patent [19]

Verlijsdonk

[11] Patent Number: 4,827,187
[45] Date of Patent: May 2, 1989

[54] LUMINESCENT BARIUM-HEXA-ALUMINATE, LUMINESCENT SCREEN PROVIDED WITH SUCH AN ALUMINATE AND LOW-PRESSURE MERCURY VAPOR DISCHARGE LAMP PROVIDED WITH SUCH A SCREEN

[75] Inventor: Johannus G. Verlijsdonk, Eindhoven, Netherlands

[73] Assignee: U.S. Philips Corporation, New York, N.Y.

[21] Appl. No.: 175,882

[22] Filed: Apr. 1, 1988

[30] Foreign Application Priority Data

Apr. 14, 1987 [NL] Netherlands ......................... 8700876

[51] Int. Cl.$^4$ ............................................. C09K 11/64
[52] U.S. Cl. ............................. 313/486; 252/301.4 R; 428/690; 313/487
[58] Field of Search ................. 252/301.4 R; 313/486, 313/487; 428/690

[56] References Cited

U.S. PATENT DOCUMENTS 4,110,660  8/1978  Wolfe ........................... 252/301.4 R
4,733,126  3/1988  Yamakawa et al. ......... 252/301.4 R

FOREIGN PATENT DOCUMENTS 51-60693  5/1976  Japan ............................ 252/301.4 R Primary Examiner—Jack Cooper
Attorney, Agent, or Firm—John C. Fox

[57] ABSTRACT

Luminescent $Eu^{2+}$ activated barium-hexa-aluminate mainly having the crystal structure of $\beta'$-alumina and being defined by the formula $(x-p)BaO \cdot pEuO \cdot (6-0.67x)Al_2O_3$ in which $0.90 \leq x \leq 1.22$ and $0.005 \leq p \leq 0.25$ and in which 1 to 20 mol % of the BaO is replaced by at least one of the oxides CaO and $0.67Li_2O$, exhibits improved performance as a blue line emitter.

6 Claims, 1 Drawing Sheet

LUMINESCENT BARIUM-HEXA-ALUMINATE, LUMINESCENT SCREEN PROVIDED WITH SUCH AN ALUMINATE AND LOW-PRESSURE MERCURY VAPOR DISCHARGE LAMP PROVIDED WITH SUCH A SCREEN

BACKGROUND OF THE INVENTION

The invention relates to a luminescent $Eu^{2+}$ activated barium-hexa-aluminate mainly comprising the crystal structure of $\beta'$-alumina. The invention also relates to a luminescent screen provided with such an aluminate and to a low-pressure mercury vapour discharge lamp provided with such a screen.

$Eu^{2+}$ activated aluminates of Ba and/or Sr and/or Ca defined by the formula $Ba_xSr_yCa_zEu_pAl_{12}O_{19}$ in which $x+y+z+p=1$ and $0.001 \leq p \leq 0.1$ are known from British Patent Specification No. 1,190,520. The Patent Specification does not state any details on the crystal structure of these efficient luminescent materials. It was, however, known that these materials have a hexagonal crystal structure, which was assumed to relate to the structure of the mineral magnetoplumbite ($BaFe_{12}O_{19}$). This has indeed proved to be the case for both strontium-hexa-aluminate and for calcium-hexa-aluminate defined by the above-mentioned formula.

However, an Article in Mat. Res. Bull., Vol., 21, 1986, pp. 135–1310, proves that barium-hexa-aluminate occurs in two different phases, namely a barium-poor phase with the crystal structure of $\beta$-alumina and a barium-rich phase with the crystal structure of $\beta'$-alumina. The structures of the two alumina phases are hexagonal and, although related to that of magnetoplumbite, are clearly different therefrom and from each other. The Article further shows that these barium-hexa-aluminates luminesce efficiently upon activation by $Eu^{2+}$ under excitation by short-wave ultraviolet radiation (for example 254 nm). The $\beta$-alumina phase exhibits a blue-green emission in a band with a maximum at approximately 476 nm and a half value width of approximately 135 nm, while the $\beta'$-alumina phase emits blue radiation in a band with a maximum at approximately 437 nm and a half value width of approximately 55 nm.

According to the articles the two phases in which barium-hexa-aluminate occurs can be described with molecular formulas which are derived from $\beta$-alumina, $NaAl_{11}O_{17}$, and $\beta'$-alumina, $Na_{1.5}Al_{10.5}O_{16.5}$, respectively. By replacing 75% of the $Na^+$-ions by $Ba^{2+}$-ions and the remaining 25% by $O^{2-}$-ions in the formula $NaAl_{11}O_{17}$ of $\beta$-alumina and in the formula $Na_{1.5}Al_{10.5}O_{16.5}$ of $\beta'$-alumina, $Ba_{0.75}Al_{11}O_{17.25}$ is obtained for the barium-poor phase with the $\beta$-alumina structure and $Ba_{1.125}Al_{10.5}O_{16.875}$ is obtained for the barium-rich phase with $\beta'$-alumina structure. In these formulas, the sum of the number of large ions ($Ba^{2+}+O^{2-}$ and $Na^++O^{2-}$, respectively) per molecule is equal to 18.

The comparatively narrow band emission with a maximum at 437 nm of $Eu^{2+}$ activated barium-hexa-aluminate having the $\beta'$-alumina structure is very desirable for several practical applications. However, a drawback of this material is that a disturbing quantity of the barium-poor phase with the $\beta$-alumina structure is obtained in addition to the desired barium-rich phase with the $\beta'$-alumina structure during preparation. Even in the case of starting from the stoichiometric quantities associated with the $\beta'$-alumina phase it appears that disturbing side phases may occur. A result thereof is that the barium-hexa-aluminate yields a considerable part of its emission at wavelengths of more than 500 nm. Consequently, suitability of the material for use as a line emitter, for example as the blue component in a low-pressure mercury vapour discharge lamp provided with luminescent materials which emit in three narrow spectral ranges (the so-called three-line lamps) is decreased.

An object of the invention is to provide a luminescent $Eu^{2+}$ activated barium-hexa-aluminate which mainly has the crystal structure of $\beta'$-alumina and whose emission above 500 nm is considerably suppressed.

SUMMARY OF THE INVENTION

According to the invention a luminescent $Eu^{2+}$ activated barium-hexa-aluminate mainly having the crystal structure of $\beta'$-alumina is characterized in that the aluminate is defined by the oxide formula $$(x-p)BaO \cdot pEuO \cdot (6-0.67x)Al_2O_3$$

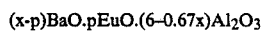

in which $0.90 \leq x \leq 1.22$ and $0.005 \leq p \leq 0.25$ and in which 1 to 20 mol% of the BaO is replaced by at least one of the oxides CaO and $0.67Li_2O$.

The fundamental lattice $xBaO \cdot (6-0.67x)Al_2O_3$, in which the sum of the large ions $Ba^{2+}+O^{2-}$ is equal to 18 corresponds for $x=1.125$ to the molecular formula $Ba_{1.125}Al_{10.5}O_{16.875}$.

Measurements have proved that the emission above 500 nm is considerably reduced in the $Eu^{2+}$ activated barium-hexa-aluminates mainly having the crystal structure of $\beta'$-alumina, if the aluminate lattice comprises at least one of the elements Ca and Li. An explanation for this fact may be that the elements Ca and Li suppress the emission of the barium-hexa-aluminate having the crystal structure of $\beta$-alumina which is possibly present in a slight quantity. A second possible explanation is that the formation of the barium-hexa-aluminate having the crystal structure of $\beta$-alumina is suppressed by the elements Ca and Li during the preparation of the luminescent aluminate.

It has been found that the $\beta'$-alumina phase is obtained for values of x in the range of $0.90 \leq x \leq 1.22$. The use according to the invention of the elements Ca and/or Li is represented in this case as a replacement of the oxide BaO by the oxides CaO and/or $0.67Li_2O$, in which the sum of the number of large ions remains constant (namely 18). If more than 20 mol% of the BaO, EuO is replaced by at least one of the oxides CaO and $0.67Li_2O$ in the aluminate lattice, too large quantities of unwanted side phases are produced, such as hexagonal calcium aluminate ($CaAl_{12}O_{19}$) having the crystal structure of magnetoplumbite, and lithium aluminate ($LiAl_5O_8$) having the spinel structure. Due to the presence of such side phases, the $Eu^{2+}$ emission of the barium-hexa-aluminate having the crystal structure of $\beta'$-alumina is detrimentally influenced. If in the aluminate lattice less than 1 mol% of the BaO, EuO is replaced by CaO and/or $0.67Li_2O$, the concentration of Ca and/or Li is too low to achieve the envisaged favourable effect.

As is common practice, the Eu concentration in the luminescent aluminates according to the invention may be chosen within a wide range. The above-mentioned concentrations are used for obtaining an efficient emission. This means that per mol of the aluminate, 0.005 to 0.25 mol of BaO is replaced by EuO.

Aluminates according to the invention are preferred in which $1.05 \leq x \leq 1.20$, and in which 5 to 15 mol% of the BaO is replaced by CaO and/or $0.67Li_2O$. The best results have been obtained with such concentrations of Ca and/or Li.

BRIEF DESCRIPTION OF THE DRAWINGS

Embodiments of luminescent $Eu^{2+}$ activated barium-hexa-aluminates according to the invention will now be described in greater detail with reference to the accompanying drawing and a number of examples of preparation.

In the drawing

DESCRIPTION OF THE PREFERRED EMBODIMENTS

Figure 1:
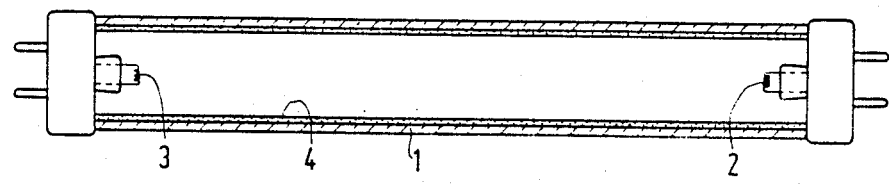
FIG. 1 shows a diagrammatic cross-section of a low-pressure mercury vapour discharge lamp provided with a luminescent screen comprising a luminescent $Eu^{2+}$ activated barium-hexa-aluminate according to the invention.

FIG. 1 shows in a diagrammatic cross-section a low-pressure mercury vapour discharge lamp having a tubular glass wall 1. Electrodes 2 and 3, between which the discharge is maintained during operation, are placed at the ends of the lamp. The lamp contains a small quantity of mercury and a rare gas as a starter gas. The wall 1 constitutes a luminescent screen and serves as a support for the luminescent layer 4 comprising a luminescent aluminate according to the invention. The layer 4 may be provided in a conventional manner on the wall 1, for example by means of a suspension comprising the luminescent material.

EXAMPLE 1

A mixture was made in parts by weight of
3.424 of $BaCO_3$
0.161 of $CaCO_3$
9.176 of $Al_2O_3$
0.176 of $Eu_2O_3$
0.049 of $H_3BO_3$.

Figure 2:
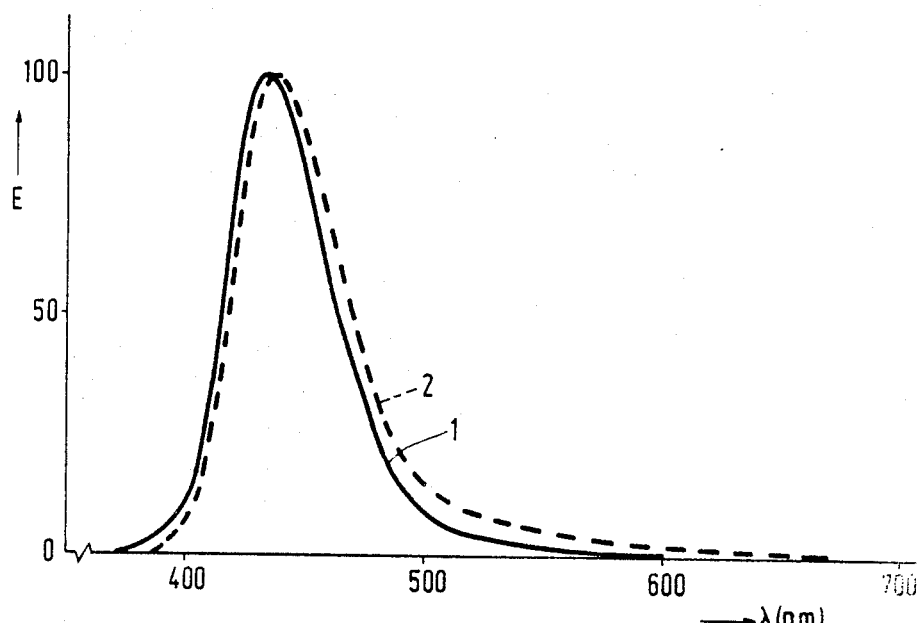
FIG. 2 shows graphically the spectral energy distribution of the emission of $Eu^{2+}$ activated barium-hexa-aluminate according to the invention, and of an $Eu^{2+}$ activated barium-hexa-aluminate having the crystal structure of $\beta'$-alumina which comprises none of the oxides of Ca and/or Li. The radiation energy E is plotted in arbitrary units as a function of the wavelength $\lambda$ in this Figure.

This mixture was fired three times for 1 hour in a weakly reducing atmosphere ($N_2$ comprising 5 vol.% of $H_2$) at a temperature of 1550° C. After each firing treatment the product was cooled and pulverised. The aluminate thus obtained, in which 8 mol% of the BaO is replaced by CaO, is defined by the formula $(1.009BaO).(0.093CaO).(0.058EuO).(5.22Al_2O_3)$. The emission spectrum of this aluminate upon excitation by 254 nm radiation is shown by the solid-line curve 1 in FIG. 2. For the purpose of comparison, the broken-line curve 2 shows the emission spectrum of the barium-hexa-aluminate $(0.981BaO).(0.109EuO).(5.273Al_2O_3)$ comprising none of the oxides CaO and/or $0.67Li_2O$. This FIG. 2 shows that the emission above 500 nm in the aluminate comprising Ca according to the invention is considerably suppressed as compared with the known aluminate.

EXAMPLES 2 TO 15

In a manner corresponding to that described in Example 1, a number of aluminates according to the invention were obtained with the fundamental lattice defined by the formula $(1.102BaO).(0.058EuO).(5.225Al_2O_3)$; in which CaO and/or $0.67Li_2O$ were substituted in different quantities for BaO. Unless otherwise stated, the $0.67Li_2O$ was added to the firing mixture as $Li_2CO_3$.

Table 1 below states the quantum efficiency Q (in %) upon excitation by 254 nm radiation of these materials and also of the material according to Example 1. Table 1 also states the UV absorption A (in %) and the wavelength $\lambda_{max}$ (in nm) at which the emission is maximum. Table 1 also states the width of the uninterrupted wavelength range in which 76% of the energy is emitted $E_{12-88}$ (in nm). Outside this range the remaining 24% of the emission is found, namely 12% at smaller wavelengths and 12% at larger wavelengths. As the value of $E_{12-88}$ is smaller, the quantity of energy which is emitted above 500 nm is smaller. Furthermore, Table 1 indicates by means of a and b (in mol%) the quantity of BaO which is replaced by CaO and $0.67Li_2O$, respectively. If a flux is used in the preparation of the barium-hexa-aluminate, this flux is also mentioned in Table 1. For the purpose of comparison, the barium-hexa-aluminate comprising none of the oxides CaO and/or $0.67Li_2O$ mentioned in Example 1 is incorporated in the Table. This aluminate is indicated by BAL. As may be seen from the Table, the values of $E_{12-88}$ range from 58 to 68 for the aluminates of the invention, versus a value of 80 for BAL, indicating a smaller quantity of energy emission above 500 nm for the aluminates of this invention.

TABLE 1

| ex | a (mol %) | b (mol %) | flux | Q (%) | A (%) | $\lambda_{max}$ (nm) | $E_{12-88}$ (nm) |
|---|---|---|---|---|---|---|---|
| 1 | 8 | 0 | $H_3BO_3$ | 89 | 86 | 435 | 58 |
| 2 | 16 | 0 | $H_3BO_3$ | 79 | 86 | 434 | 58 |
| 3 | 4 | 0 | $H_3BO_3$ | 88 | 87 | 434 | 61 |
| 4[1] | 4 | 0 | | 82 | 80 | 435 | 68 |
| 5[1] | 0 | 6 | | 84 | 75 | 435 | 66 |
| 6 | 0 | 6 | | 81 | 74 | 436 | 61 |
| 7 | 0 | 12 | | 77 | 73 | 437 | 61 |
| 8 | 0 | 3 | | 82 | 74 | 435 | 62 |
| 9[2] | 0 | 3 | | 86 | 89 | 436 | 63 |
| 10 | 0 | 3 | $BaF_2$ | 87 | 92 | 436 | 67 |
| 11 | 0 | 3 | $BaCl_2$ | 86 | 80 | 435 | 68 |
| 12 | 0 | 3 | $H_3BO_3$ | 86 | 85 | 435 | 60 |
| 13 | 4 | 3 | | 84 | 76 | 436 | 59 |
| 14 | 4 | 9 | $H_3BO_3$ | 86 | 85 | 435 | 58 |
| 15 | 4 | 4,5 | $AlF_3.3 H_2O$ | 86 | 89 | 435 | 58 |
| BAL | 0 | 0 | | 88 | 91 | 441 | 80 |

[1] twice fired for 1 hour at 1550° C.
[2] $0.67 Li_2O$ added as LiF instead of $Li_2CO_3$ By mixing an aluminate according to the invention with a green luminescing (Ce,Tb)MgAl$_{11}$O$_{19}$ and a red luminescing Y$_2$O$_3$:Eu$^{3+}$, a mixture is obtained which is very suitable for use in a so-called three-line lamp. Table 2 below compares at different colour temperatures of the emitted radiation such a three-line mixture with a similar mixture in which barium-hexa-aluminate without Ca and/or Li substitution is used. The Table states the relative luminous flux ETA (in Lm/W) of the mixtures at different colour temperatures (in K). The mixtures with the aluminate according to the invention in which Ca is present are indicated in the table by BAL-Ca, while the mixtures with the aluminate without Ca and/or Li substitution are indicated by BAL.

TABLE 2

| colour temp. (K) | ETA BAL-Ca (Lm/W) | ETA BAL (Lm/W) |
|---|---|---|
| 2660 | 90.5 | 90.5 |
| 2930 | 89.3 | 89.1 |
| 4015 | 88.7 | 88.1 |
| 5000 | 85.8 | 85.0 |
| 6300 | 84.3 | 83.3 |

A three-line mixture with (Ce,Tb)MgAl$_{11}$O$_{19}$ and Y$_2$O$_3$:Eu$^{3+}$ was made of the aluminate (0.983BaO).(0.066CaO).(0.055EuO).(5.262Al$_2$O$_3$). From this mixture low-pressure mercury vapor discharge lamps of the TLD 36W type were made, having an initial colour point x=0.3832 and y=0.3762 and a colour temperature of approximately 3850 K. Table 3 below shows the relative luminous flux (in Lm/W), the relative luminous flux with respect to that at 100 operating hours (in %) and the colour point shift Δx/Δy with respect to the initial colour point of these lamps after 0, 100, 350 and 1000 operating hours.

TABLE 3

| operating period (h) | rel. luminous flux (Lm/W) | (%) | Δx/Δy |
|---|---|---|---|
| 0 | 90.89 | 101.2 | 0.0000/0.0000 |
| 100 | 89.82 | 100.0 | 0.0012/0.0010 |
| 350 | 89.14 | 99.2 | 0.0024/0.0028 |
| 1000 | 86.64 | 96.5 | 0.0037/0.0047 |

What is claimed is:

1. A luminescent Eu$^{2+}$ activated barium-hexa-aluminate mainly having the crystal structure of β'-alumina, characterized in that the aluminate is defined by the formula (x-p)BaO.pEuO.(6-0.67x)Al$_2$O$_3$ in which $0.90 \leq x \leq 1.22$ and $0.005 \leq p \leq 0.25$ and in which 1 to 20 mol% of the BaO is replaced by at least one of the oxides CaO and 0.67Li$_2$O.

2. A luminescent aluminate as claimed in claim 1, in which $1.05 \leq x \leq 1.20$ and in which 5 to 15 mol% of the BaO is replaced by CaO and/or 0.67Li$_2$O.

3. A luminescent screen having a luminescent layer provided on a support, comprising a luminescent aluminate as claimed in claim 2.

4. A low pressure mercury vapour discharge lamp provided with a luminescent screen as claimed in claim 3.

5. A luminescent screen having a luminescent layer provided on a support, comprising a luminescent aluminate as claimed in claim 1.

6. A low-pressure mercury vapour discharge lamp provided with a luminescent screen as claimed in claim 5.

* * * * *